(12) United States Patent
Jywe et al.

(10) Patent No.: US 8,542,358 B2
(45) Date of Patent: Sep. 24, 2013

(54) OPTICAL CALIBRATION AND TESTING DEVICE FOR MACHINE TOOLS

(75) Inventors: Wen-Yuh Jywe, Huwei Township, Yulin County (TW); Chia-Hung Wu, Taixi Township, Yunlin County (TW); I-Ching Chen, Huwei Township, Yunlin County (TW); Tung-Hui Hsu, Kaohsiung (TW); Ren-Chieh Fung, Taichung (TW); Teng-Yu Yang, Taichung (TW)

(73) Assignee: National Formosa University, Yunlin County (TW)

( * ) Notice: Subject to any disclaimer, the term of this patent is extended or adjusted under 35 U.S.C. 154(b) by 218 days.

(21) Appl. No.: 13/075,249

(22) Filed: Mar. 30, 2011

(65) Prior Publication Data

US 2011/0261348 A1   Oct. 27, 2011

(30) Foreign Application Priority Data

Apr. 27, 2010 (TW) .................... 99113263 A (51) Int. Cl.
 *G01B 11/00* (2006.01)
 *G01B 11/26* (2006.01)
(52) U.S. Cl.
 USPC ...... 356/399; 356/400; 356/141.1; 356/141.3
(58) Field of Classification Search
 USPC ............. 356/490, 508, 72–73, 53–55, 138, 356/147, 399, 400; 355/52–77
 See application file for complete search history.

(56) References Cited

U.S. PATENT DOCUMENTS

| | | | | | |
|---|---|---|---|---|---|
| 3,684,381 | A | * | 8/1972 | Zoot | 356/138 |
| 3,762,820 | A | * | 10/1973 | Zoot et al. | 356/141.1 |
| 4,297,031 | A | * | 10/1981 | Hamar | 356/247 |
| 4,382,680 | A | * | 5/1983 | Hamar | 356/247 |
| 4,590,682 | A | * | 5/1986 | Koch | 33/383 |
| 4,889,425 | A | * | 12/1989 | Edwards et al. | 356/141.3 |
| 5,774,211 | A | * | 6/1998 | Ohtomo et al. | 356/141.2 |
| 7,119,901 | B2 | * | 10/2006 | Lysen | 356/399 |
| 7,636,170 | B1 | * | 12/2009 | Jywe et al. | 356/614 |
| 2007/0229802 | A1 | * | 10/2007 | Lau | 356/73 |
| 2011/0261348 | A1 | * | 10/2011 | Jywe et al. | 356/72 |

\* cited by examiner

*Primary Examiner* — Gregory J Toatley
*Assistant Examiner* — Maurice Smith
(74) *Attorney, Agent, or Firm* — Chun-Ming Shih (57) ABSTRACT

An optical calibration and testing device for machine tools includes a light source unit, a beam splitter, and at least one photo detector. The light source emits a laser light hitting the beam splitter and is split into two beams. One is perpendicular to the foundation of the light source unit, and the other is parallel with the foundation so as to test straightness, inclination angle, verticalness, vertical column inclination, vertical column parallelism and guide bar inclination of a machine tool. If there is no tested error, the position of the testing light spot coincides with that of the initial light spot. If there is an error, the position of testing light spot varies according to the error.

8 Claims, 10 Drawing Sheets

OPTICAL CALIBRATION AND TESTING DEVICE FOR MACHINE TOOLS

BACKGROUND OF THE INVENTION

1. Field of the Invention

The present invention relates to optical calibration and testing device for machine tools, and more particularly, to a testing device for testing straightness, angle, vertical straightness, vertical column parallelism, vertical column inclination and guide bar inclination of a machine tool.

2. Description of the Prior Art

A large size working platen is one of the machine tools which is commonly utilized in the domestic engineering field. Recently, the development of the large size working platen has made a remarkable progress due to great effort of study performed by the fields of engineering and academy. Accordingly, the precision of testing is improving higher and higher.

Presently, the laser interferometer is commonly acknowledged as one of the best precise testing devices for testing geometrical error of a machine tool. Moreover, it is characterized in not only having a wide range of testing but also a high resolution when testing an object of nanometer class. It is what the reason that this device has been widely applied for testing various high precision apparatus including the computerized numerical control (CNC), cubic mounting machine (CMM), high precision grinders and semiconductor devices. However, the laser interferometer is not allowable to easily use in ordinary machine workshops essentially by reason the cost as high as NT$6,000,000 that causes the general refinery workshops being not affordable. Beside, there are testing modules of angle error, straightness error, vertical straightness error, each of them costs as high as NT$1,500,000 or higher, but for the performance, only a single test item can be carried out with each of them, and each of them has its own particular mounting scheme. All of these disadvantageous factors are added up to keep the user back from installing such testing devices.

Aiming at the above depicted disadvantages, the present invention is to propose a newly developed construction of an optical calibration and testing device for machine tools. This invention is attributive to the inventor's intensive research based on many years of experience gained through professional engagement with the related products.

SUMMARY OF THE INVENTION

Accordingly, it is an object of the present invention to provide an optical calibration and testing device for machine tools which can carry out high precision optical calibration and testing for the machine tools.

It is another object of the present invention to provide an optical calibration and testing device for machine tools which is able to generate a laser light vertical to the ground surface and a laser light parallel with the ground surface; and the testing results can be free from the influence of structure of the machine tools so as to avoid occurrence of the test error.

It is one more object of the present invention to provide an optical calibration and testing device for machine tools which is compact in size, easy to carry, rapidly performable of testing with high precision and can be produced with low cost.

To achieve these and other objects mentioned above, the optical calibration and testing device thereof comprises a foundation which being a straight rule for settling a light source for emitting a laser light. A foundation for light source position for setting a light source to provide a fixed angle for emitting a laser light. A level testing device which being an electric level is installed on the foundation for adjusting the horizontal and vertical positions of the foundation so as to keep the foundation vertical to the ground surface. A beam splitting device for splitting any one of the laser beams into two beams, the beam splitting device is a beam splitter for splitting the laser light into a reflection light and a transmission light perpendicular to each other, or the beam splitting device is a penta mirror or a beam splitter for turning the laser light 90 degrees, the penta mirror has an incident surface, a light emission surface and at least a reflection surface, and the angle between the incident surface and the emission surface is 90 degrees. The optical calibration and testing device also comprises at least one photo detector with a receiving surface aligned with the light radiating direction for receiving light beams.

When testing without using the beam spitting device, the laser light from the light source strikes the photo detector in the direction parallel with the testing direction. If there is no tested error, the position of a testing light spot coincides with that of the initial one. On the contrary, if there is a tested error, the position of the testing light spot varies according to the tested error.

If the beam splitting device is used for testing, the laser light from the light source is split into two beams after striking the light splitting device, one is perpendicular to the foundation, while the other parallel with the foundation so as to be applicable for testing straightness, angle, verticalness, vertical column parallelism, vertical column inclination and guide bar inclination. If there is no tested error, the position of a testing light spot coincides with that of the initial one. On the contrary, if there is a tested error, the position of the testing light spot varies according to the tested error.

BRIEF DESCRIPTION OF THE DRAWINGS

The drawings disclose an illustrative embodiment of the present invention which serves to exemplify the various advantages and objects hereof, and are as follows.

DETAILED DESCRIPTION OF THE PREFERRED EMBODIMENT

Figure 1:
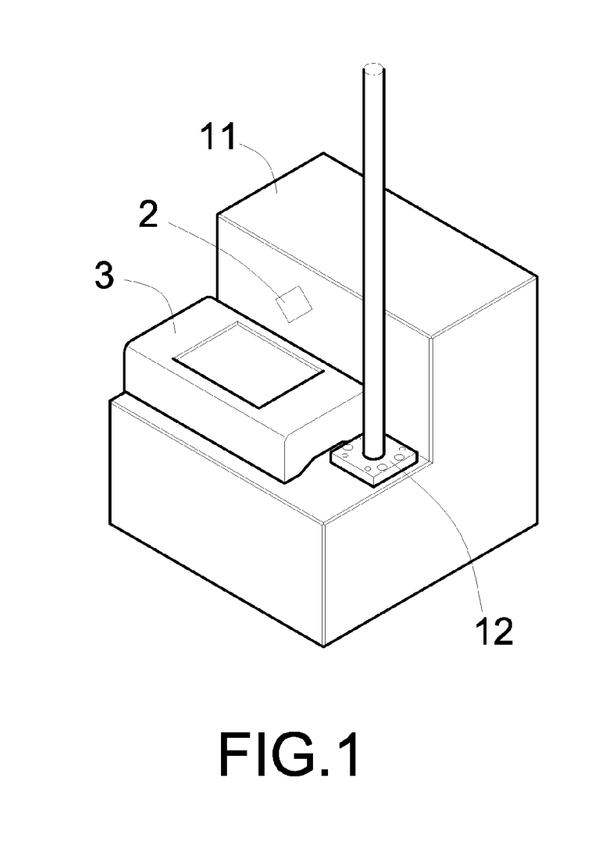
FIG. 1 and FIG. 2 are schematic views of a light source unit, which show two beams perpendicular to each other, one of them is perpendicular to the reference surface to a L shaped straight rule, and the other parallel with the reference surface thereof.
Figure 2:
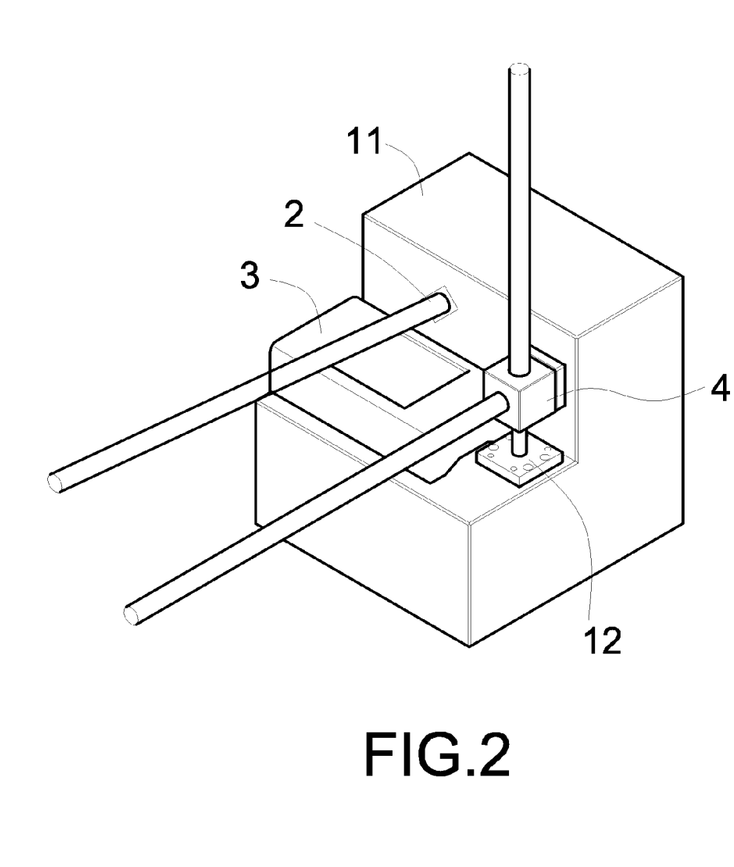

Referring to FIG. 1 and FIG. 2, the optical calibration and testing device for machine tools essentially comprises a light source unit 1, a light source position unit 2, a beam splitter device 4 and at least a photo detector 5.

The light source unit 1 further comprises a foundation 11 loading a light source 12, the foundation 11 provides a position to mount a level testing device 3 and the beam splitter device 4.

The foundation 11 is a straight rule for fixing the light source 12 that emits a laser light, the light source 12 can further provide a collimated light source, or the light emitted from the light source 12 is split into two beams by a beam splitting device 4 which is a beam splitting prism installed on the way of the laser light transmission route for splitting this laser light into a reflection light and a transmission light perpendicular to each other.

The level testing device 3 is an electric level installed on the foundation 11 for adjusting the horizontal angle and the vertical angle of the foundation 11 so as to allow the light source 12 loaded thereon that is able to emit the laser beam parallel or perpendicular to the ground surface.

The beam splitting device 4 is for splitting anyone of the laser beam into two, and further can serve as: 1) a beam splitting mirror or a beam splitter (prism) for splitting one laser beam into a reflection beam and a transmission beam perpendicular to each other, and: 2) a penta mirror for turning the laser light 90 degrees. The penta mirror has an incident surface, a transmission surface and at least one reflection surface such that the penta mirror has a 90 included angle between the incident surface and transmission surface.

The photo detector 5 has a receiving surface aligned with the direction of light emission so as to receive the incident light.

When testing is carried out without using the beam splitting device 4, the light source 12 emits a laser light in the direction parallel with the testing direction to hit the photo detector 5 usable for testing vertical column inclination, vertical column parallelism, and guide bar inclination angle ($\theta_\chi$) about the X axis.

Figure 3:
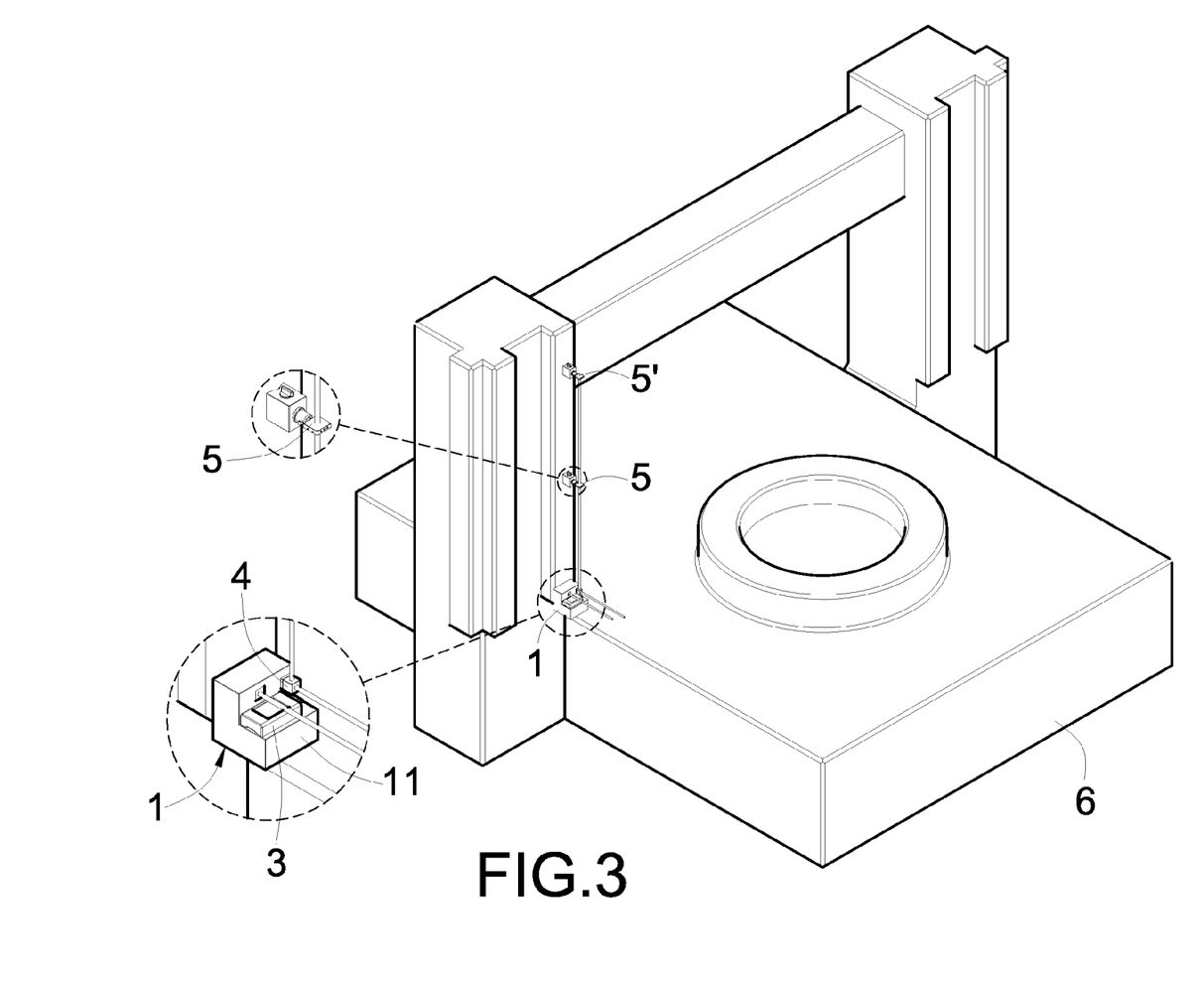
FIG. 3 and FIG. 3A show a light beam emitted from the light source unit perpendicular to the ground surface, this beam strikes the photo detector installed on the vertical column for testing vertical column inclination.
Figure 3A:
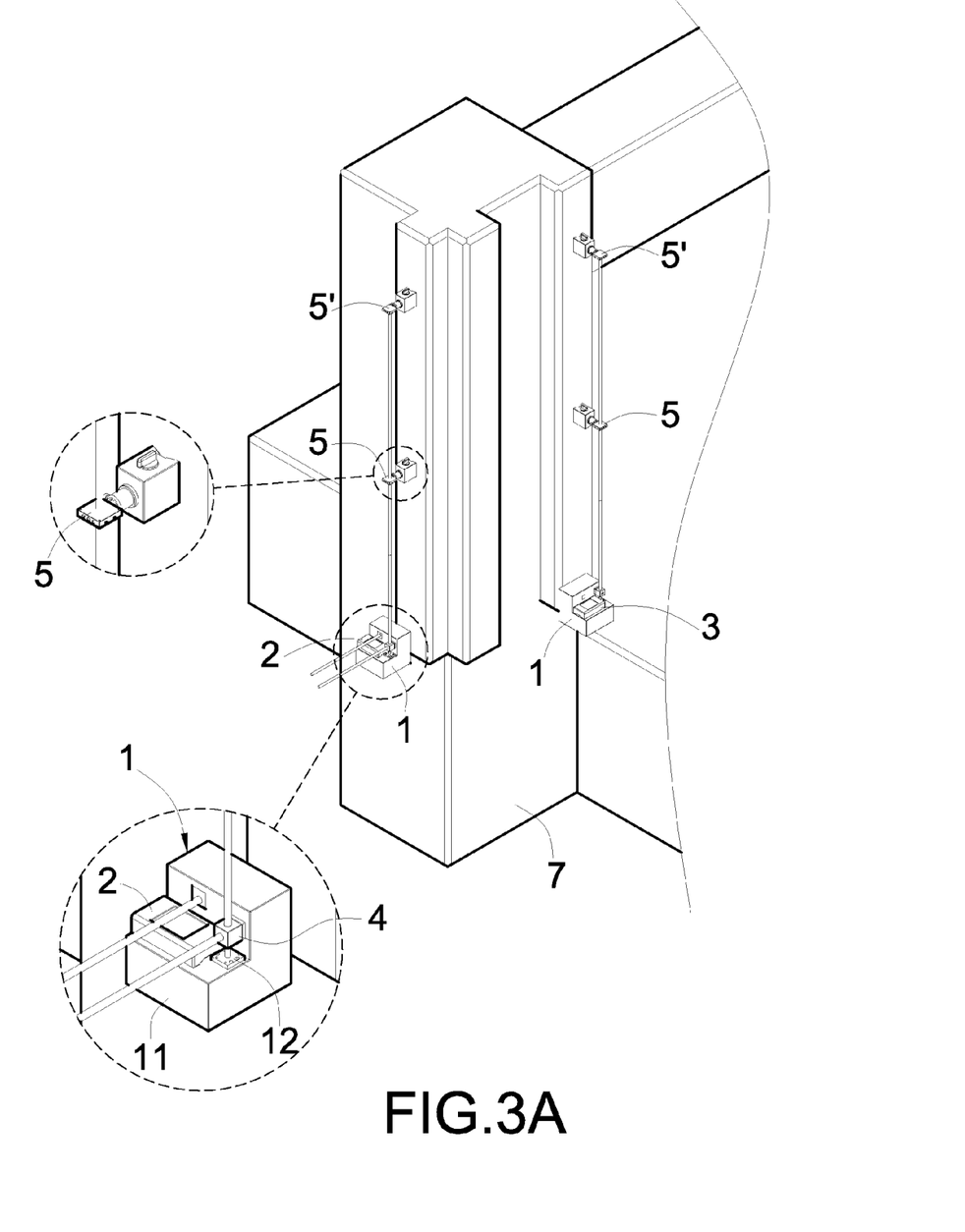
Figure 4:
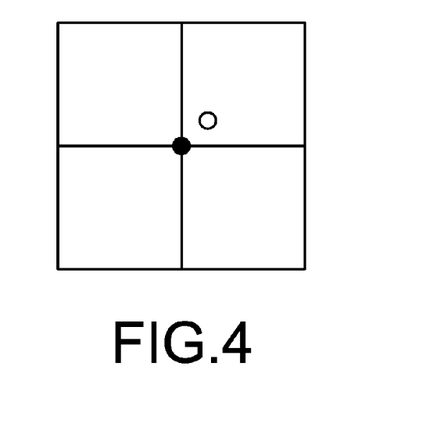
FIG. 4 is a schematic view showing the testing light spot on the photo detector varies its position in accordance with the tested error.

Referring to FIG. 3, when this optical calibration and testing device for machine tools is used to test the vertical column inclination, it consists of the light source unit 1 and the photo detector 5. The latter is for receiving a collimated beam emitted by the former so as to test vertical column inclination. When in testing, the light source unit 1 is placed on the reference surface for testing the vertical column inclination, and by observing the level testing device 3 to adjust the inclination angle of the light source unit 1 so as to cause the light source unit 1 to emit a beam perpendicular to the ground surface and hit the photo detector 5 which is placed on the vertical column thereby forming an initial light spot on the photo detector 5. Afterwards by removing the photo detector 5 to a second place 5' if it is found that there is no tested error, the position of the testing light spot on the second place photo detector 5' coincides with that of the initial light spot on the photo detector 5. On the contrary, if there is a tested error, the position of the testing light spot on the photo detector 5' varies in accordance with the error (see FIG. 4). After that the vertical column inclination of a machine tool 7 under test can be figured out using a proper formula.

Figure 5:
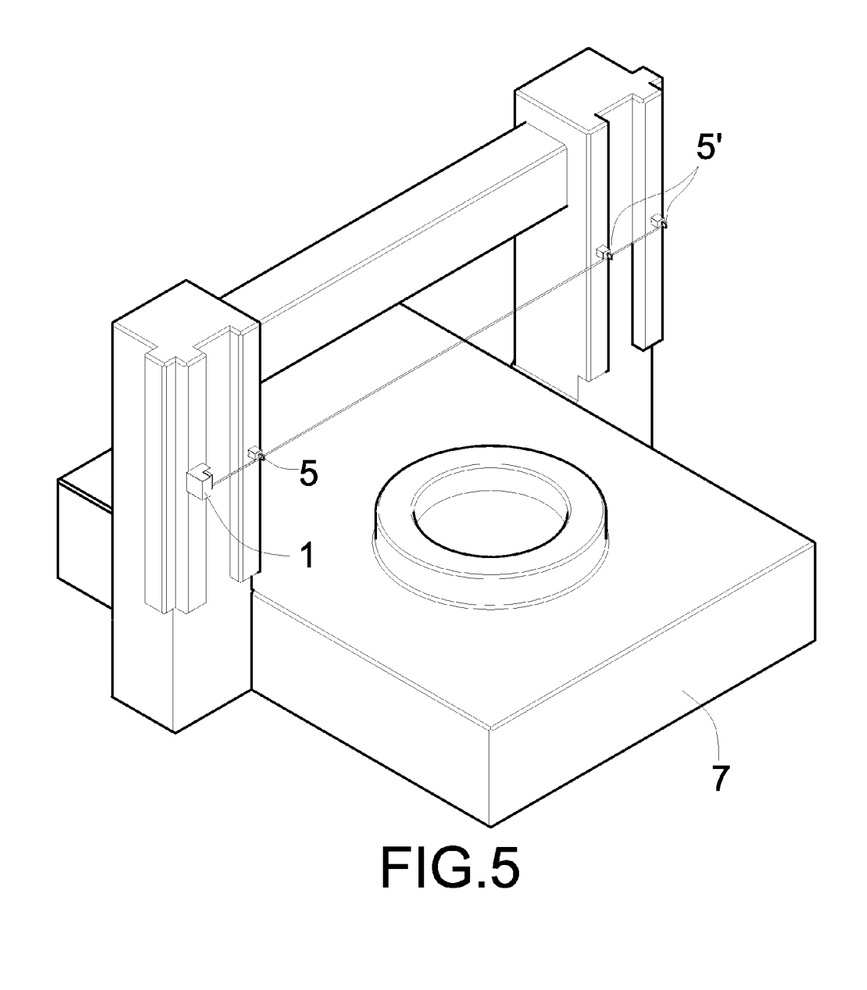
FIG. 5 shows a light beam parallel with the ground surface emitted from the light source unit hits the photo detector located between two vertical columns for testing parallelism of the vertical columns.

Referring to FIG. 5, when this optical calibration and testing device for machine tools is used to test vertical column parallelism, it consists of the light source unit 1 and the photo detector 5. The latter is for receiving a collimated beam emitted by the former so as to test vertical column parallelism. When in testing, the light source unit 1 is placed on the reference surface for testing the vertical column parallelism, and by observing the level testing device 3 to adjust the inclination angle of the light source unit 1 so as to cause the light source unit 1 to emit a beam parallel with the ground surface and hit the photo detector 5 which is placed on the vertical column thereby forming an initial light spot on the photo detector 5, wherein the emitting direction of the beam is parallel with the testing direction.

Afterward the photo detector 5 is removed to another vertical column and becomes a second photo detector 5', a testing light spot will be formed on the second photo detector 5'. If it is found that there is no tested error, the position of the testing light spot coincides with that of the initial light spot. On the contrary, if there is a tested error, the position of the testing light spot varies in accordance with the error (see FIG. 4). After that remove the light source unit 1 and the photo detector 5 to another position on the reference testing surface of the vertical column parallelism, and remove the photo detector 5 to the place of the photo detector 5' on another vertical column, the vertical column parallelism of the machine tool 7 under test can be figured out according to a proper formula.

Figure 6:
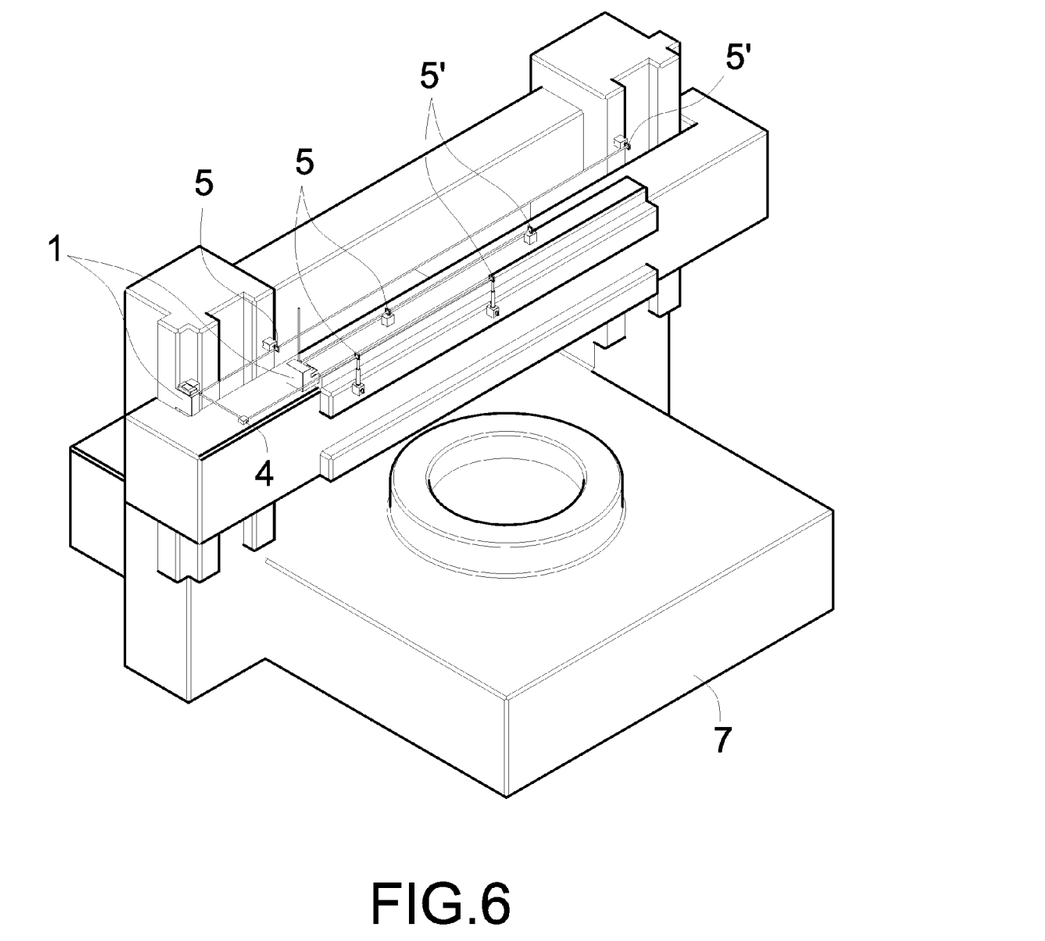
FIG. 6 and FIG. 6A show a light beam parallel with the ground surface emitted from the light source unit hits the photo detector located on a guide bar for testing inclined angle ($\theta\chi$) of the guide bar about the X axis.
Figure 6A:
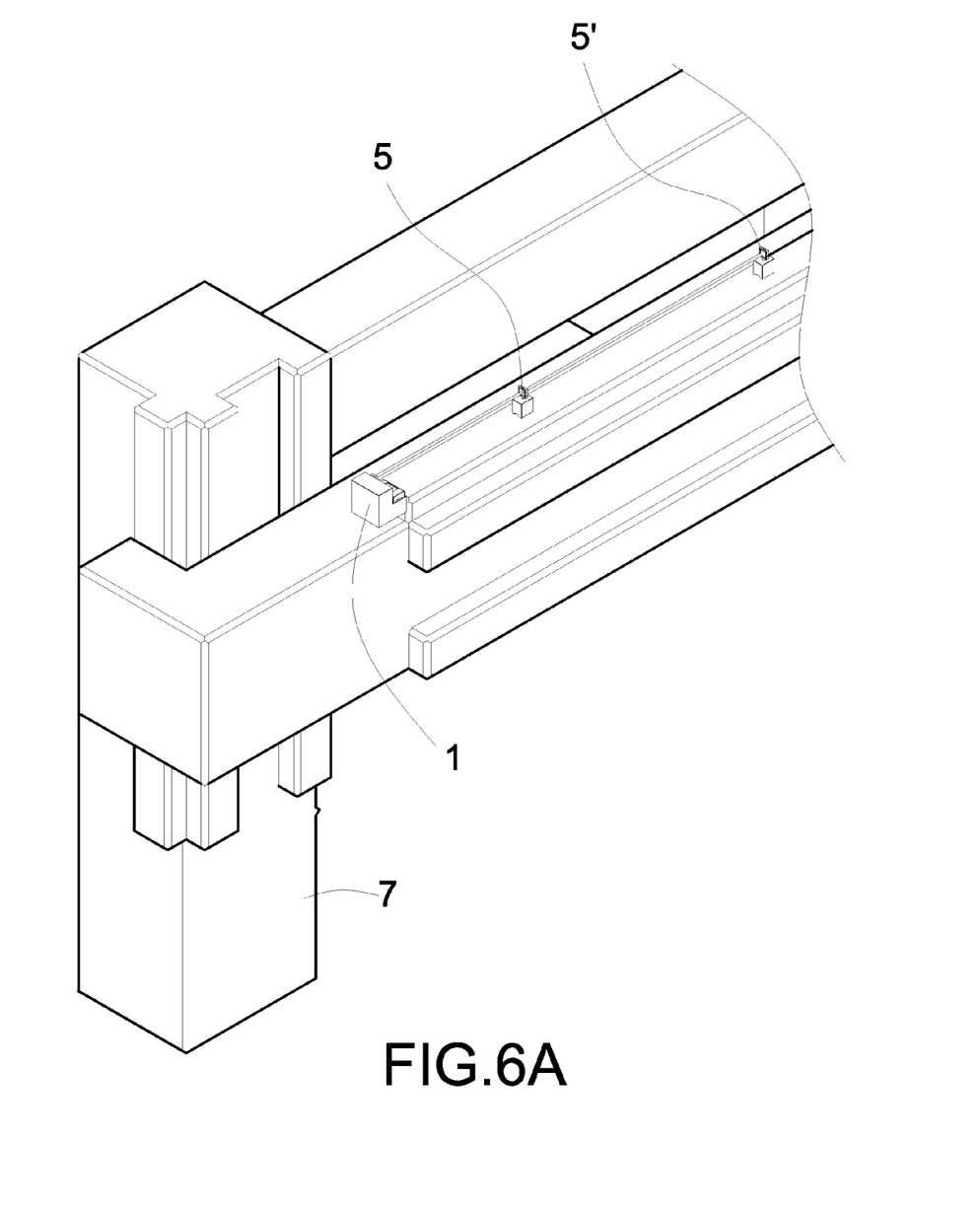

Referring to FIG. 6, when this optical calibration and testing device for machine tools is to be used to test the guide bar inclination, it consists of a light surface unit 1, two photo detectors 5 and a beam spitting device 4 (penta mirror) for receiving a collimated light beam emitted from the light source 12 of the light source unit 1 so as to test guide bar inclination. When in testing, the light source unit 1 is placed on the reference surface for testing the guide bar inclination, and by observing the level testing device 3 to adjust the inclination angle of the light source unit 1 so as to cause the light source unit 1 to emit a beam parallel with the ground surface and hit the photo detector 5 placed on the guide bar, and form an initial light spot on the photo detector 5, wherein the emitting direction of the beam is parallel with the testing direction.

Afterwards the photo detector 5 is removed to another place where the photo detector 5' is and forming a testing light spot. If it is found that there is no tested error, the position of the testing light spot coincides with that of the initial light spot. On the contrary, if there is a tested error, the position of the testing light spot varies in accordance with the error (see FIG. 4). After that the inclination angle ($\theta_\chi$) about the X axis of the machine tool 7 under test can be figured out according to a proper formula.

Meanwhile, in case the light splitting device 4 is used for testing the laser light emitted from the light source 12 is split into two beams by the light splitting device 4, one of the two is perpendicular to the foundation 11, and the other one is parallel with the foundation 11 so that it is applicable for testing the inclination angle (θχ) of the guide bar about the Y axis, the straightness testing, the angle testing and the verticalness testing. If it is found that there is no tested error, the position of the testing light spot on the photo detector 5' coincides with the position of the initial light spot on the photo detector 5. On the contrary, if there is a tested error, the position of the testing light spot on the photo detector 5' varies in accordance with the error.

Figure 7:
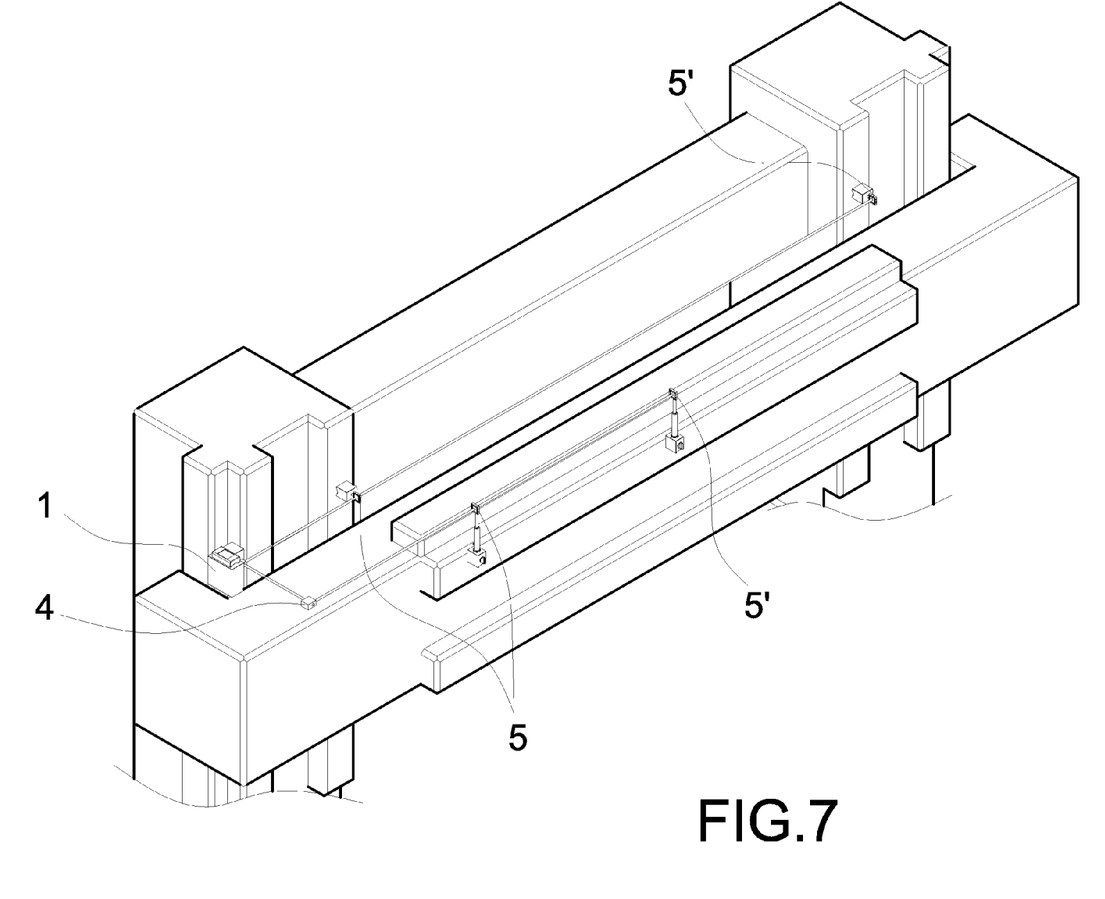
FIG. 7 shows a light beam parallel with the ground surface is emitted from the light source unit, and the other light beam emitted from the light source unit is perpendicular to the former, one of them passes through a penta mirror, and two light beams become parallel with each other and respectively hit a photo detector located on the vertical column, and the other located on the guide bar so as to test parallelism between the vertical column and the guide bar.

Referring to FIG. 7, place the light source unit 1 on a calibrated vertical column, and emit a beam parallel with the ground surface, and another beam perpendicular to the former. The one which in parallel with the ground surface hits the photo detector 5 placed on the vertical column, while the other one hits the photo detector 5 placed on the guide bar via beam splitting device 4 (penta mirror), then turning 90° and keeping parallel with the other beam which is parallel with the ground surface. Both are parallel with each other.

Remove the photo detector 5 to the position of the photo detector 5'. If it is found that there is no tested error, the position of the testing light spot coincides with that of the initial light spot. On the contrary, if there is a tested error, the position of the testing light spot varies in accordance with the error (see FIG. 4). After that the parallelism of the vertical column and the guide bar of the machine tool 7 under test can be figured out according to a proper formula.

Figure 8:
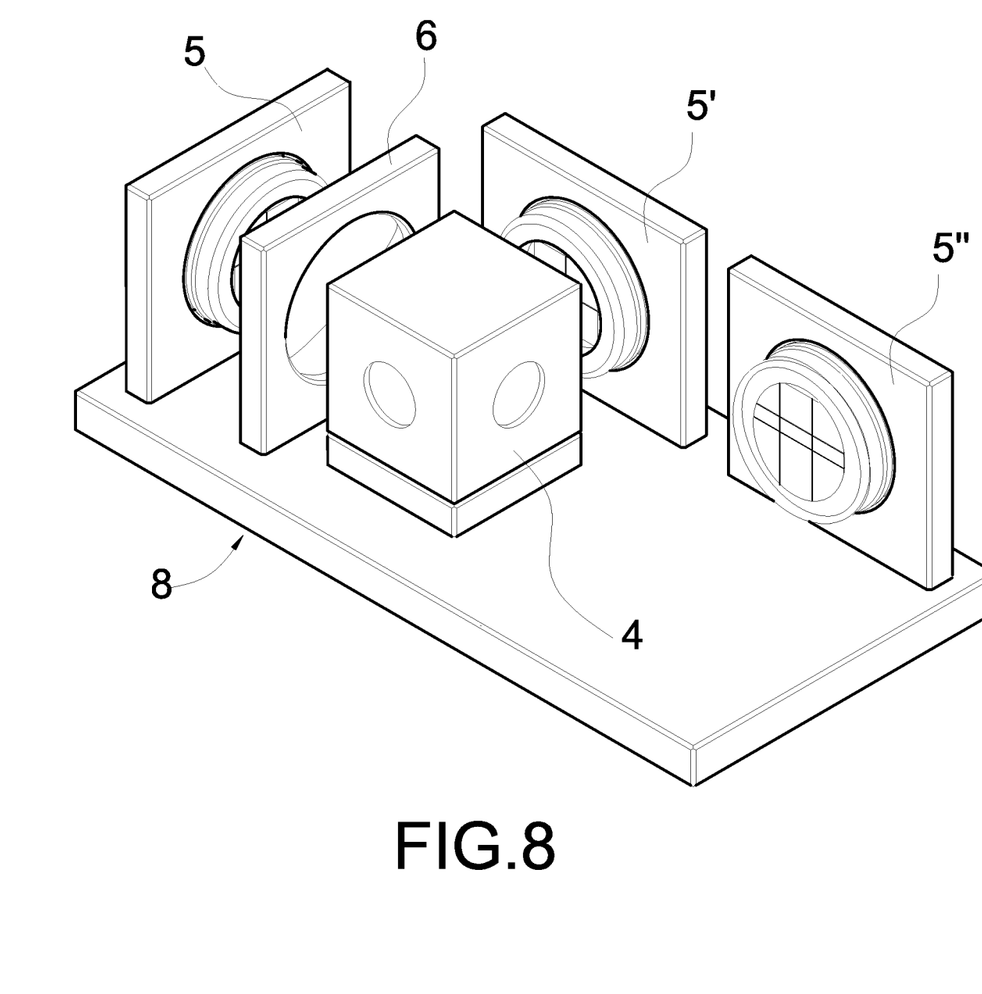
FIG. 8 shows the state that the incident laser light is split into two beams after transmitting through the beam splitter, one of them directly hits the photo detector after passing through the beam splitter for testing straightness error, the other one hits the photo detector after being focused by a lens for testing angle error, wherein another light source position laser directly hits the photo detector to figure out the amount of displacement made by a straightness, angle and displacement measuring unit.

Referring to FIG. 8, this is a straightness, angle and displacement measuring unit 8 for the optical calibration and testing device for machine tools. It consists of the light splitting device 4 (beam splitter), a focusing lens 6 and three photo detector 5 so as to receive a collimated beam emitted from the light source unit 1 for testing two straightness errors and two angle errors in a single axis direction.

As the laser light transmits through the beam splitter 4, it is split into two beams, one of them directly hits the photo detector 5', while the other one hits the photo detector 5 after passing through the lens 6. The emitting direction of the laser light is parallel with the testing direction, and the influence of distance variation between the light source 12 and the photo detector 5 is eliminated by using a visual gage, therefore the angle error between two testing directions can be determined whether the position of the initial light spot coincides with that of the testing light spot, wherein the moving terminal is the moving main axis or moving platform of the machine tool under test.

At the moment the laser light emitted form the light source 12 is split into two beams by the beam splitting device 4 (beam splitter), one of them directly hits the photo detector 5' for testing a straightness error, while the other one hits the photo detector 5 via the lens 6 for testing angle error, or may do without the lens 6, and instead of it, allow the other beam to directly hit the photo detector 5. By means of the two different light spots gained by the photo detector 5, the tested angle error and straightness error can be figured out by proper calculation. Another laser beam emitted by the light source position unit 2 directly hits the photo detector 5', and the displacement of the straightness, angle and displacement measuring unit 8 can be figured out by proper calculation.

Figure 9:
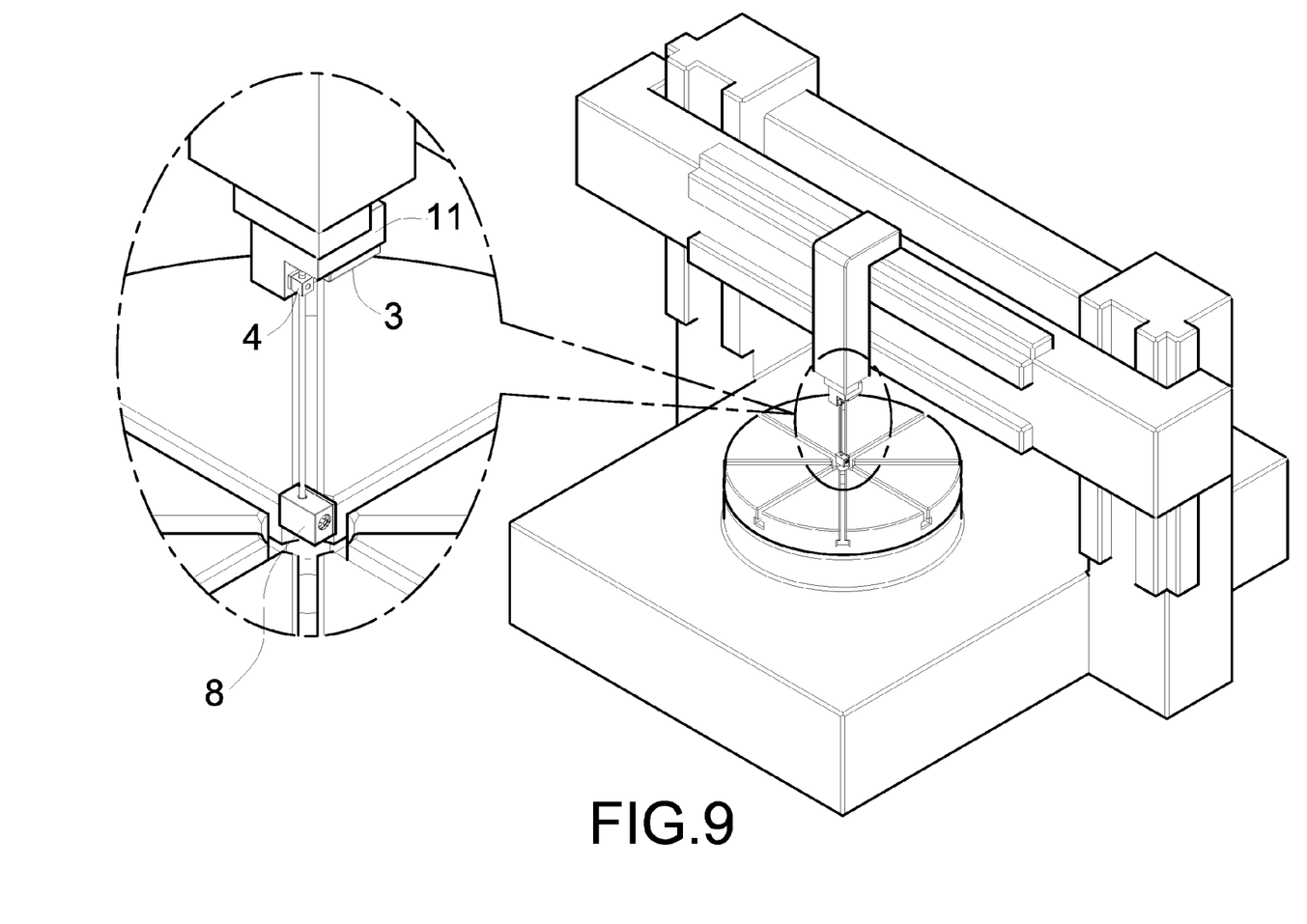
FIG. 9 shows a light beam perpendicular to the ground surface is emitted from the light source unit, and hits the straightness and angle testing module placed on the machine tool for testing single axis vertical straightness error, horizontal straightness error, pitch error and yaw error.

Referring to FIG. 9, in this case the light source unit 1 is fixed onto the moving axis, and a light beam perpendicular to the ground surface emitted from the light source hits the straightness angle and displacement measuring unit 8, forming an initial light spot respectively on both photo detectors 5.

Afterwards remove a straightness, angle and displacement measuring unit 8 a or light source unit 1 to the next testing position, and forming a testing light spot formed by the two photo detectors 5 placed on the next testing position. If it is found that there is no tested error, the position of the testing light spot coincides with that of the initial light spot. On the contrary, if there is a tested error, the position of the testing light spot varies in accordance with the error (see FIG. 4). After that the straightness error and the inclination angle error of the moving axis, i.e. the vertical straightness error, the horizontal straightness error, the pitch error and the yaw error can be figured out according to a proper formula. Incidentally the light source unit 1 and the straightness, angle and displacement measuring unit 8 are allowed to interchange their setting positions.

Figure 10:
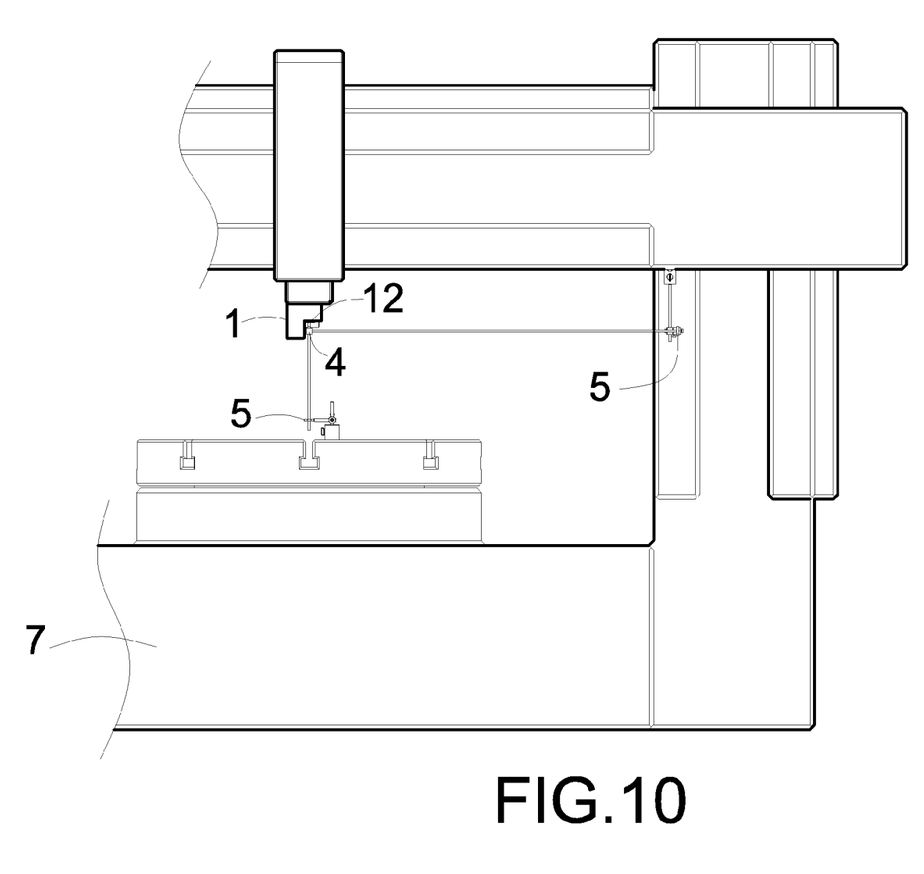
FIG. 10 shows a light beam perpendicular to the ground surface, and a light beam parallel with the ground surface are emitted from the light source unit and respectively hit the photo detectors placed on two axes for testing verticalness of the two axes.

Referring to FIG. 10, in case the optical calibration and testing device for machine tools is to be used for testing verticalness, it is composed of the light source unit 1 and two photo detectors 5 so as to receive a collimated light beam emitted from a geometric error testing device thereby testing the straightness error along any two axis directions, and the verticalness error along the two axis directions can be figured out by calculation. The light source unit 1 is fixed onto the axis to emit a light beam perpendicular the ground surface and another light beam is parallel with the ground surface, these two beams are perpendicular to each other and respectively hit the other photo detector 5 on the two axes.

Afterwards, remove the position of two axes on which the photo detector 5 is fixed. If it is found that there is no tested error, the position of the testing light spot coincides with that of the initial light spot. On the contrary, if there is a tested error, the position of the testing light spot varies in accordance with the error (see FIG. 4). After that the verticalness of the two axes can be figured out according to a proper formula.

In all, the present invention is a high level technical creation and by no means simply utilizes conventional technology or knowledge known prior to the application for patent or can be easily made by persons skilled in the arts. The invention has neither been published or put to public use, nor displayed in an exhibition, therefore the invention is entitled to patent.

Many changes and modification in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. An optical calibration and testing device for machine tools comprising:
   a light source unit having a foundation for fixing a light source to provide at least one laser light;
   a horizontalness testing device which is a leveling instrument installed on said foundation for adjusting an angular position of said foundation;
   a beam splitting device for splitting said laser light into two beams; and
   a plurality of photo detectors with their receiving surfaces aligned with an incident beam so as to receive a light beam,
   wherein said light source emits the laser light into said light splitting device so as to split said laser light into said two laser beams as a transmission light and a reflection light perpendicular to each other, using said two laser beams to hit a first and a second photo detectors placed on a moving terminal in the direction perpendicular to each other, a verticalness error at said moving terminal is figured out whether the position of an initial light spot coincides with that of a testing light spot or not.

2. The testing device of claim 1, wherein said beam splitting device is a penta mirror, or a beam splitter for turning said laser beam 90 degrees.

3. The testing device of claim 2, wherein said penta mirror has an incident light surface, a transmission light surface and at least one reflection light surface, wherein an included angle between said incident surface and said transmission surface is 90°.

4. The testing device of claim 1, wherein said light source is placed on a reference surface for a vertical column testing to emit said laser light, said laser light hits said photo detector placed on said vertical column, the direction of said laser light is parallel with the testing direction of said photo detector, an inclination angle of said vertical column is figured out whether the position of an initial light spot coincides with that of a testing light spot or not.

5. The testing device of claim 1, wherein said light source is placed on the reference surface for a guide bar testing to emit said laser light hitting said photo detector placed on said guide bar, emitting direction of said laser light is parallel with the testing direction of said photo detector, and an inclination angle of said guide bar is figured out whether the position of an initial light spot coincides with the of a testing light spot or not.

6. The testing device of claim 1, wherein one of said two laser beams directly hits said first photo detector, while the other one of said two laser beams hits said second photo detector after passing through a focusing lens, an emitting direction of said laser light is parallel with testing direction of a geometric error testing device, by applying principle of visual gage to eliminate influence of variation of distance between said light source and said photo detector, an error at a moving terminal is figured out whether the position of an initial light spot coincides with that of a testing light spot or not.

7. The testing device of claim 1, further comprises a light source position unit including a foundation for the light source to provide at least one fixed angle for emitting the laser light.

8. The testing device of claim 7, wherein said light source position unit emits another laser light to directly hit another photo detector so as to detect the amount of displacement made by a straightness, angle and displacement measuring unit.

\* \* \* \* \*